United States Patent

Attenburrow et al.

[11] Patent Number: 5,171,605
[45] Date of Patent: Dec. 15, 1992

[54] HIGH PROTEIN CRUMBS FOR COATING FOODSTUFFS

[75] Inventors: Geoffrey E. Attenburrow, Vorburg, Netherlands; Rachel M. Goodband, Northants, England; Leo W. A. Melles, Vlaardingen, Netherlands

[73] Assignee: Unilever Patent Holdings B.V., Rotterdam, Netherlands

[21] Appl. No.: 279,617

[22] Filed: Dec. 5, 1988

[30] Foreign Application Priority Data

Dec. 3, 1987 [GB] United Kingdom ............... 8728282
Dec. 3, 1987 [GB] United Kingdom ............... 8728283

[51] Int. Cl.⁵ ............................................. A23L 1/176
[52] U.S. Cl. ....................................... 426/656; 426/89; 426/94; 426/292; 426/549; 426/657; 426/96
[58] Field of Search ............... 426/89, 94, 96, 549, 426/292, 293, 656, 657

[56] References Cited

U.S. PATENT DOCUMENTS

| | | | |
|---|---|---|---|
| 3,185,574 | 5/1965 | Gabby et al. | |
| 3,889,003 | 6/1975 | Yourman | 426/580 |
| 3,978,236 | 8/1976 | Sair et al. | 426/445 |
| 4,007,289 | 2/1977 | Jaekering | 426/549 |
| 4,188,410 | 2/1980 | Rispoli et al. | 426/296 |
| 4,260,637 | 4/1981 | Rispoli et al. | 426/96 |
| 4,283,425 | 8/1981 | Yuan et al. | 426/102 |
| 4,356,202 | 10/1982 | Todd | 426/138 |
| 4,364,961 | 12/1982 | Darley et al. | 426/19 |
| 4,367,242 | 1/1983 | Jarvis et al. | 426/293 |
| 4,438,146 | 3/1984 | Colby | 426/448 |
| 4,440,793 | 4/1984 | Seki | 426/549 |
| 4,568,550 | 2/1986 | Fulger et al. | 426/19 |
| 4,609,558 | 9/1986 | Giancone et al. | 426/549 |

FOREIGN PATENT DOCUMENTS

| | | |
|---|---|---|
| 11174 | 5/1980 | European Pat. Off. . |
| 115108 | 8/1984 | European Pat. Off. . |
| WO8501188 | 3/1985 | PCT Int'l Appl. . |
| 626057 | 7/1949 | United Kingdom . |
| 990523 | 4/1965 | United Kingdom . |
| 1013356 | 12/1965 | United Kingdom . |
| 2005981 | 5/1979 | United Kingdom . |
| 2084849 | 4/1982 | United Kingdom . |
| 2176089 | 12/1986 | United Kingdom . |

*Primary Examiner*—Joseph Golian
*Assistant Examiner*—Evan Federman
*Attorney, Agent, or Firm*—Cushman, Darby & Cushman

[57] ABSTRACT

Foodstuffs comprising a bakery component and a moist filling or other component, in the form of crumbs for coating a moist filling are described which contain a heat set protein, which reduces the problems associated with moisture when the foodstuff is stored over long periods of time, under conditions of high humidity, or when heated in a microwave oven.

5 Claims, 3 Drawing Sheets

□ = EXTRUDED GLUTEN
△ = EXTRUDED STARCH

● = GLUTEN
○ = STANDARD CRUMB
■ = GLUTEN + 6% FAT

HIGH PROTEIN CRUMBS FOR COATING FOODSTUFFS

This invention relates to foodstuffs. In particular it relates to foodstuffs comprising a bakery component and a moist filling or other component, and foodstuffs in the form of crumbs for use in coating a moist component.

There are known in the art several types of foodstuffs which comprise a bakery component and a moist filling or other component. Such foodstuffs include coated food products such as coated meat, fish, poultry or vegetable products. Also included are pies, tacoshells, pizza bases and ice cream cones which are filled or topped with a moist component.

One of the problems associated with such foodstuffs is the degradation of quality which occurs, particularly when the foodstuffs are stored for long periods of time. This is believed to be due to moisture migration from the moist filling or other component to the bakery component.

This problem is magnified when the foodstuff is stored under relatively high humidity conditions, such as those present in a deep freezer and when the foodstuffs are then thawed.

If the foodstuff is heated in a microwave oven prior to consumption then a further reduction in quality may occur. This is because this method of heating results in migration of moisture from the moist filling or other component to the bakery component. Since the air surrounding the foodstuff in the microwave oven is not heated to any large extent moisture removal from the bakery component is not effected efficiently. This may lead to a bakery component with a high level of moisture and therefore, a reduced quality as it tends to become soggy.

Previously, it has been suggested that this problem can be overcome by the application of a barrier coating between the bakery component and the moist filling or other component. However, this solution is often inadequate, especially when fast production of the foodstuffs results in fractured barrier coatings and long storage times are involved.

It is an object of the present invention to provide a bakery component, and a foodstuff in the form of crumbs, which can withstand high levels of moisture without a significant reduction in the quality of these products. A further object of the invention is to provide a bakery component, and a foodstuff in the form of crumbs, which, when in contact with a moist filling or other component can withstand heating in a microwave oven without an excessive reduction in quality.

We have discovered that these objectives can be achieved if the bakery component, or the foodstuff in the form of crumbs, comprises more than 30% of a heat set protein.

Thus according to one aspect of the invention there is provided a foodstuff comprising a bakery component and a moist filling or other component, such that moisture tends to migrate to the bakery product during storage, characterised in that the bakery component contains more than 30% of a heat set protein and a moisture content of less than 15%, by weight of the bakery component.

According to another aspect of the invention there is provided a foodstuff in the form of crumbs for use in coating a moist component from which moisture tends to migrate, characterised in that the foodstuff comprises more than 30% of a heat set protein by weight of the foodstuff.

"Heat set protein" is a protein material which has been subjected to a heat treatment and which has been irreversibly modified during this treatment.

By "crumbs" is meant particulates which, in appearance and functional behaviour, are similar to breadcrumb materials and are suitable for coating any food product, for example, meat, fish, poultry and vegetables.

The amount of protein in the bakery component or the foodstuff in the form of crumbs is higher than 30%, preferably higher than 50%, more preferably higher than 75% by weight. Higher protein levels will generally result in products of higher quality. However, in general, protein levels should not exceed 97%, otherwise the product may be too dry.

Preferably the moisture content of the bakery component is less than 10%, and is most preferably about 5% by weight of the bakery component.

When the foodstuff is in the form of crumbs, these can be used to coat a moist food component, such as fish. If desired, it is possible to use a mixture of crumbs according to the invention, which will be referred to hereinafter as protein-enriched crumbs, and conventional breadcrumbs. If such a mixture is used, the weight ratio of the protein enriched crumbs to conventional breadcrumbs should be more than 1 to 1.

Usually, coated food products are obtained by first wetting a raw or at least partially cooked, and optionally frozen, piece of food. The food can, for instance, be wetted by deglazing or dipping it into or spraying it with a fluid substance such as water or batter. After wetting, the food is coated with the protein-enriched crumbs. If desired, the steps of wetting and coating can be repeated to obtain a multilayered coated product. Prior to storage, the coating may be pre-set, for instance by pre-frying.

The protein for use in the invention can be any food grade protein or combinations thereof such as, for instance, egg albumen, soy protein, fish protein, milk protein, blood protein, sodium caseinate, gluten, maize protein, gelatin or mixtures thereof. Preferred is the use of sodium caseinate and egg albumen. Most preferred is the use of gluten.

The bakery component and the protein-enriched crumbs can also include additional ingredients such as flavouring materials, fillers, vegetable particles etc.

A preferred additional ingredient is a so-called fat-supplying system, which term is intended to cover any form of fat which is present in the bakery component or protein enriched crumbs and forms a fatty film around the moist filling or other component comprising the foodstuff upon heating. These fat-supplying systems may impart "ovenability" or "microwavability" to foodstuffs comprising a bakery component and a moist filling, or other component or moist food components which have been coated with protein-enriched crumbs, or render pre-frying unnecessary. Suitable fat-supplying systems include, fat coatings around the protein-enriched crumbs, fat beadlets incorporated in the bakery component or protein-enriched crumbs or porous particles such as, for instance, bread crumbs which contain an amount of absorbed fat mixed with the protein-enriched crumbs.

A preferred embodiment of the fat-supplying system is a cooker extruded, partially gelatinized starchy product such as, for instance, described in DE 32 06 751, having absorbed therein 1-7 times its own weight of fat and/or oil.

One of the problems with the foodstuffs according to the invention is the increased hardness of the bakery component/protein-enriched crumbs compared with standard bakery components/bread crumbs. It has been found that this hardness can be reduced without detrimentally affecting their quality by incorporating a small amount of fat into the bakery component or protein-enriched crumbs. Usually, a level of fat of 4% by weight will be sufficient. Fat levels around 6% by weight are preferred. These fat levels are calculated on the dry weight of bakery component/protein-enriched crumb, excluding the weight of a fat-supplying system, if present.

The method for obtaining the bakery component or protein-enriched crumbs according to the invention will usually involve heat treating a proteinaceous dough. Suitable heat treatments are, for example, oven baking, puffing, drum baking, pasta extrusion, roasting, grilling, cooking. If necessary, the heat treatment can involve the formation of a large piece of material which can subsequently be reduced in size to obtain the bakery component or the protein-enriched crumbs.

A preferred method for obtaining the bakery component or the protein-enriched crumbs is cooker extrusion. This method involves extrusion of a moist mixture of protein and water at an elevated pressure and temperature. One of the major advantages of this method is that the moist mixture is thoroughly mixed during heating. Furthermore, it is also possible to form the extrudate in rod-shaped pieces which are easy to handle.

Other suitable apparatuses for mixing the moist mixture include high intensity mixers, pasta machines and conventional kneading machines. If these apparatuses are used, the moisture mixture will usually require a subsequent heat treatment.

The dough from which the bakery component or the protein-enriched crumbs are prepared preferably contains 30-90% by weight of protein and an amount of water sufficient to render the dough suitable for shaping and heating. Preferably water is present at a level of from 20 to 50% by weight. If cooker extrusion is to be used, a water content of about 40% is preferred.

Surprisingly, it has been found that a better quality bakery component or protein enriched crumbs is obtained by preparation at relatively low temperatures. Specifically for gluten, temperatures of at least 60° C. and between 80° and 120° C. are preferred. After heat treatment it is generally preferred to subject the bakery component or the protein-enriched crumb to a drying treatment to reduce their moisture content to less than 10%, preferably less than 5% by weight. Any conventional method of drying can be used. Especially in the case of gluten, this drying is preferably carried out at a temperature of less than 120° C.

In addition to water and protein, the dough can comprise optional ingredients such as flavouring materials, colouring materials, starches, sugar, fats, gassifying agents, fillers etc. The bakery component or protein-enriched crumbs will preferably contain:

30-97% (ww) of protein
3-20% (ww) of water
0-40% (ww) of fat
0-40% (ww) of starch
0-60% (ww) of sugar
0-10% (ww) of additives The invention will be further illustrated by the following Examples and the accompanying drawings wherein.

EXAMPLE I

Gluten crumbs were prepared by extruding a mixture of 60% vital gluten and 40% water in a twin screw extruder at 15 bar pressure and 95° C. into rods having a diameter of 6 mm and a moisture content of 35%. The rods were dried to a moisture level of 5% by weight in a hot air oven at 70° C. and subsequently ground into crumb size.

Extruded starch was prepared by extruding a mixture of 75% wheat starch and 25% water in a twin screw extruder at 15 bar pressure and 120° C. into rods having a diameter of 6 mm and a moisture content of 20%. The rods were dried to a moisture level of 5% (ww) in a hot air oven at 70° C. and subsequently ground into crumb size.

Figure 1:
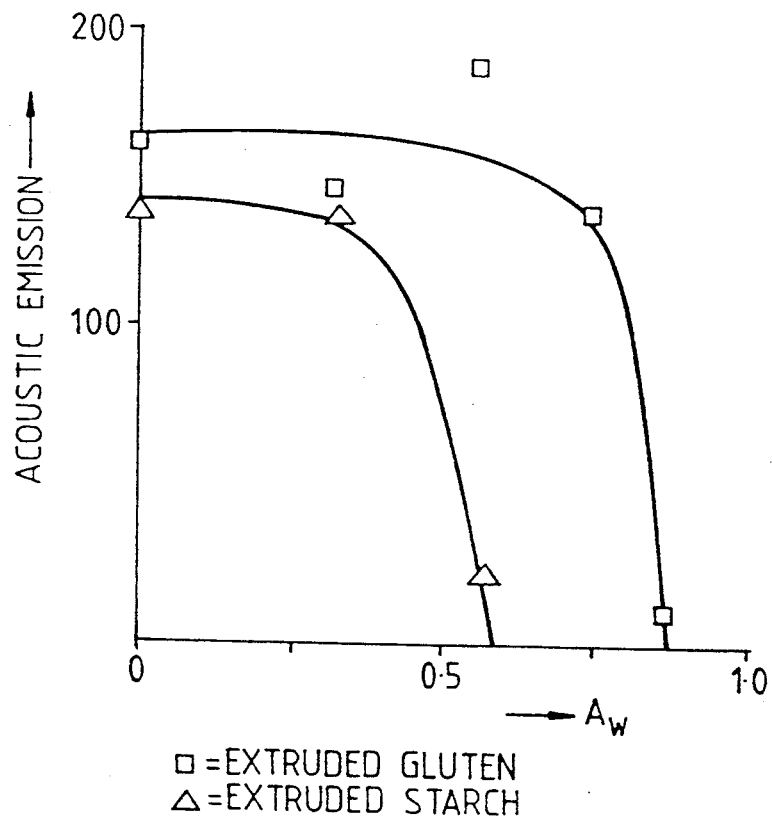
FIG. 1 is a graph of the water activity in relation to acoustic emission of gluten and starch crumbs.

An acoustic emission signal was measured with a Locan ® analyser while varying the water activity of both types of crumbs. The parameter acoustic emission is associated with crispness of the product. The results were shown in FIG. 1. This experiment clearly shows that gluten crumbs are more resistant to higher water activity ($A_w$) without loss of quality than extruded starch, i.e. gluten-enriched crumbs retain a higher proportion of their crispness/hardness compared to crumbs containing extruded starch, when the moisture content is increased.

EXAMPLE II

Figure 2:
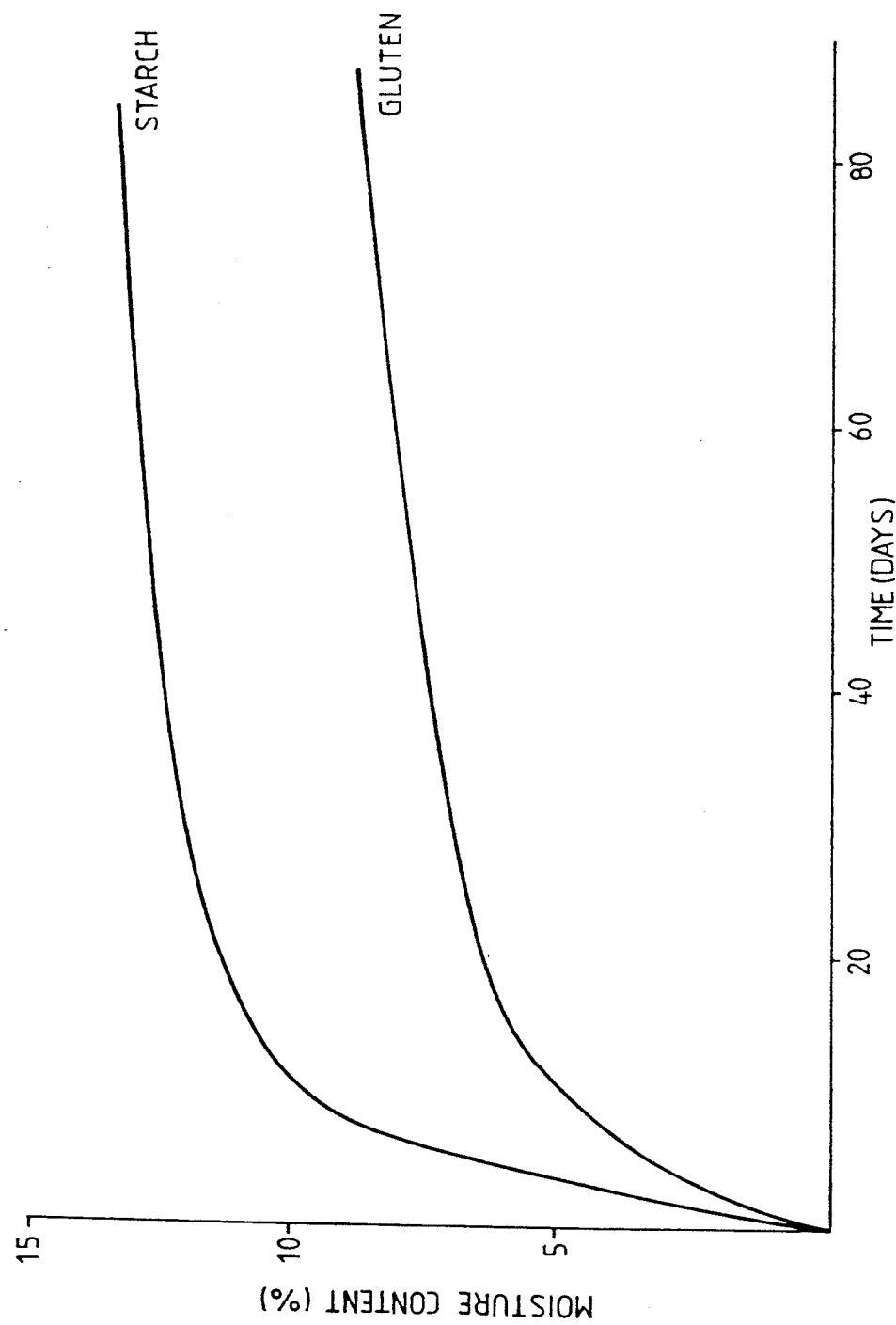
FIG. 2 is a graph of the moisture content over time of gluten and starch crumbs.

Gluten crumbs and extruded starch were prepared as described in Example I. Samples were stored in a deep freeze at −25° C. The moisture content of the samples was monitored against time. The results are shown in FIG. 2. This figure clearly shows that gluten crumbs absorb moisture at a slower rate than extruded starch. Furthermore, after prolonged periods of storage, the equilibrium moisture content of gluten crumbs is lower than the moisture content of extruded starch.

EXAMPLE III

Gluten crumbs were prepared by extruding a mixture of gluten and water at different die temperatures. The method of preparation was the same as that described in Example I. The samples were stored for 1 week at 75% relative humidity. The results are shown in Table I.

TABLE I

| Moisture content mixture | Die temperature | Acoustic Emission Signal |
| --- | --- | --- |
| 43.7 | 94 | 122 |
| 43.7 | 118 | 1 |

This table shows that crumbs obtained by extrusion at lower temperatures are more resistant to long term storage under humid conditions than crumbs extruded at higher temperatures.

EXAMPLE IV

Figure 3:
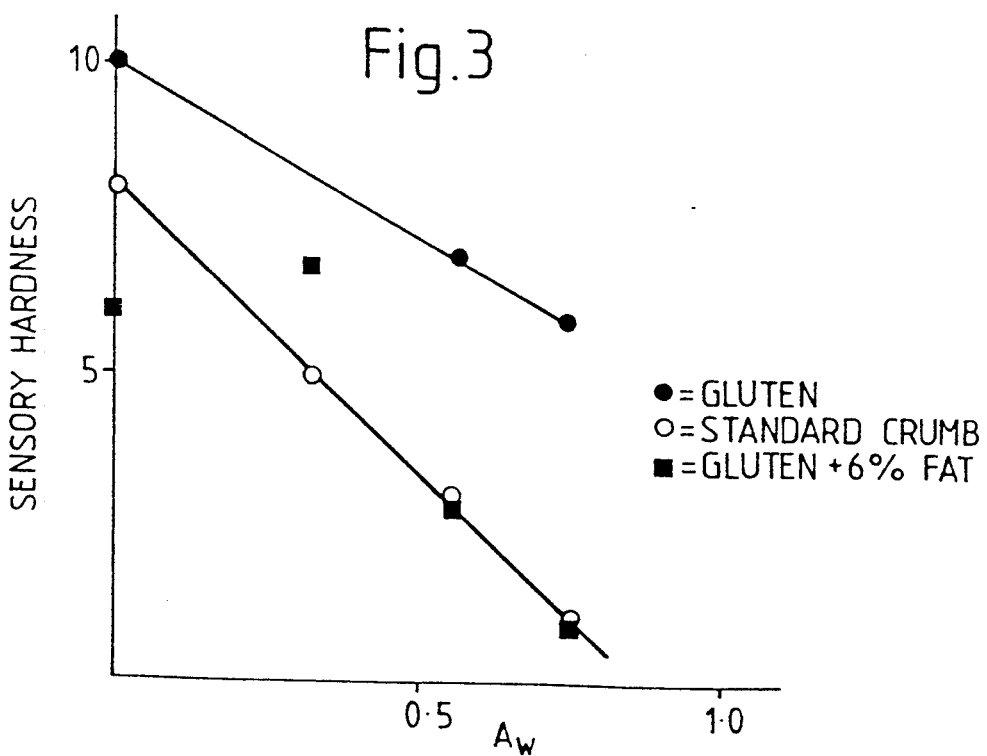
FIG. 3 is a graph of the hardness in relation to the water activity of gluten crumbs.

Gluten crumbs were prepared as described in Example I. Gluten/fat crumbs were prepared by extruding a mixture of 54% gluten, 40% water and 6% soy oil under the same conditions as described in Example 1. Both crumb materials were compared for sensory hardness with commercially available crumbs (Frocrumb ® ex RHM). The results are shown in FIG. 3. This shows that the hardness of protein-enriched crumbs can be reduced to that found in commercially available breadcrumbs by incorporating small amounts of oil.

EXAMPLE V

Figure 4:
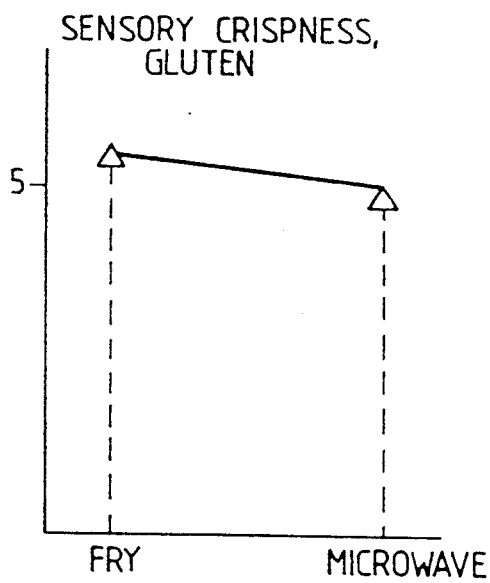
FIG. 4 is a graph of the sensory evaluation of crumbs prepared by frying and microwaving.
Figure 4:
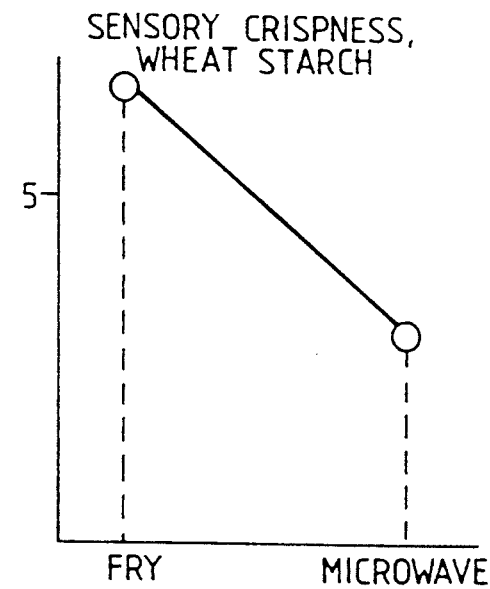
Figure 4:
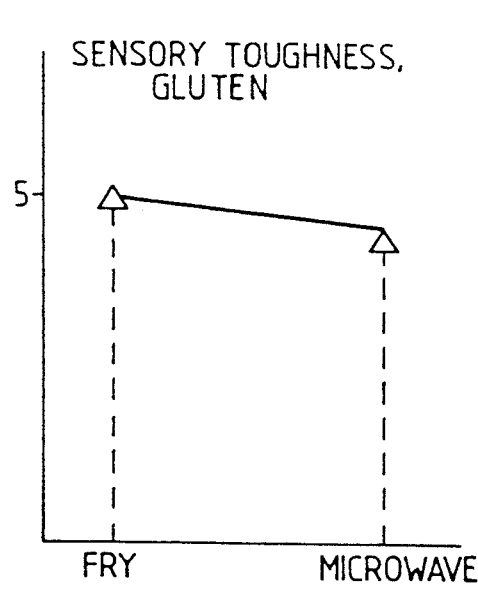
Figure 4:
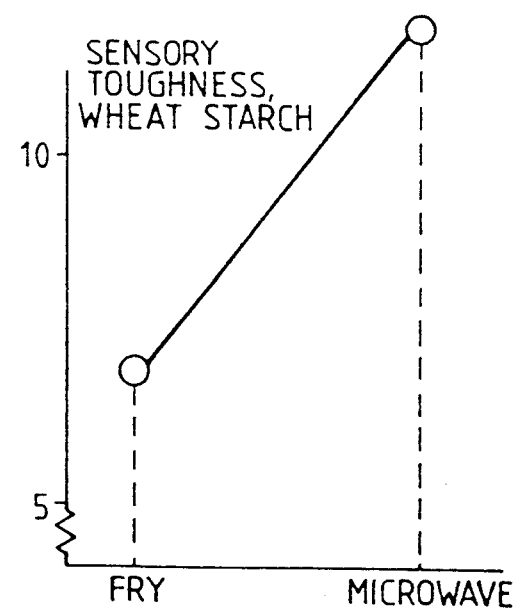

Frozen blocks of fish were coated with an adhesion batter and subsequently with gluten crumbs or extruded wheat starch as prepared in Example I. The samples were stored at −20° C. prior to cooking. The sensory toughness and sensory crispness of foodstuffs comprising either gluten crumbs or extruded wheat starch were assessed by a taste panel after the foodstuffs had either been deep fat fried or heated in a microwave oven. The results are shown in FIG. 4. These results show that foodstuffs according to the invention, after microwave-heating, have a crispness and toughness comparable to fried products.

However after microwave heating the foodstuff comprising extruded starch is much less crisp and much tougher than a fried product. Thus, foodstuffs according to the invention are more susceptible to microwave heating without a loss of quality than foodstuffs comprising extruded starch.

EXAMPLE VI

Protein-enriched crumbs were prepared from a mixture containing 60% egg albumen and 40% water. The crumbs were prepared by heat-treating the mixture at 100° C. followed by drying to a moisture level of 5% by weight in a hot air oven at 70° C. to form a material which was subsequently reduced in size.

The crumbs were subjected to the test described in Example 1 and compared with crumbs containing freeze dried egg albumen. The results showed that the crumbs containing heat-set protein retained a higher proportion of their crispness/hardness compared to crumbs containing the freeze dried protein.

EXAMPLE VII

Crumbs were prepared from a mixture of 60% sodium caseinate and 40% water by the method described in Example 1. The crumbs were subjected to the test described in Example 1. The results showed that they retained a high proportion of their crispness/hardness at a moisture content of at least 11%.

EXAMPLE VIII

Crumbs were prepared from a mixture of gluten and starch (total weight 60%) and 40% water according to the method described in Example 1. The crumbs were subjected to the test described in Example 1. The results showed that the crumbs retained their crispness/hardness at moisture content up to 10%, provided that the amount of gluten in the starting mixture was at least 40%.

We claim:

1. Foodstuff in the form of crumbs for use in coating a moist component in a bakery component, wherein the foodstuff comprises more than 30% of a heat set protein by weight of the foodstuff and from 2 to 10% by weight of fat, to prevent the migration of moisture from the moist component into the bakery component.

2. Foodstuff according to claim 1 wherein the protein is gluten.

3. Foodstuff according to claim 1 wherein the foodstuff has a moisture content of less than 15% by weight.

4. Foodstuff according to claim 1 the foodstuff is cooker-extruded.

5. Method for preparing a foodstuff according to claim 1 wherein the foodstuff is prepared by heat-treating a dough comprising 20–50% water and 30–90% protein.

* * * * *